United States Patent
Ninomiya et al.

(10) Patent No.: US 7,280,076 B2
(45) Date of Patent: Oct. 9, 2007

(54) INFORMATION PROCESSING APPARATUS WITH CONTACTLESS READER/WRITER, AND COIL ANTENNA FOR MAGNETIC COUPLING

(75) Inventors: Teruhisa Ninomiya, Kawasaki (JP); Shinichi Shiotsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/366,750

(22) Filed: Mar. 3, 2006

(65) Prior Publication Data

US 2006/0151619 A1    Jul. 13, 2006

Related U.S. Application Data

(63) Continuation of application No. PCT/JP03/15307, filed on Nov. 28, 2003.

(51) Int. Cl.
*H01Q 1/24* (2006.01)
*H01Q 1/38* (2006.01)

(52) U.S. Cl. .................................... 343/702; 343/895
(58) Field of Classification Search ........ 343/787, 343/788, 702, 700 MS, 895; 235/492, 451
See application file for complete search history.

(56) References Cited

U.S. PATENT DOCUMENTS

| | | | |
|---|---|---|---|
| 6,636,728 B1 * | 10/2003 | Avenel | 455/277.1 |
| 2003/0090429 A1 * | 5/2003 | Masudaya et al. | 343/788 |
| 2003/0210198 A1 * | 11/2003 | Nantz et al. | 343/788 |
| 2006/0176229 A1 * | 8/2006 | Copeland et al. | 343/788 |

FOREIGN PATENT DOCUMENTS

| | | |
|---|---|---|
| JP | 61-136609 | 8/1986 |
| JP | 8-263610 | 10/1996 |
| JP | 2558330 | 9/1997 |
| JP | 10-242742 | 9/1998 |
| JP | 11-213116 | 8/1999 |
| JP | 2001-156674 | 6/2001 |
| JP | 2001-284935 | 10/2001 |
| JP | 2002-305461 | 10/2002 |
| JP | 2002-344172 | 11/2002 |

* cited by examiner

*Primary Examiner*—Hoanganh Le
(74) *Attorney, Agent, or Firm*—Staas & Halsey LLP

(57) ABSTRACT

An information processing apparatus (2) has a contactless reader/writer (90), which includes a coil antenna (110) having a plurality of turns for transmitting and/or receiving an RF modulated carrier signal, by magnetic coupling. The coil antenna (110) is coupled to a transceiver (92) and is disposed in a space within a case (10) between an electric shield (70) and a casing (78) of the case (10). The coil antenna (110) is wound about one center axis (C1) over a predetermined length (L1) to have a generally tubular shape of a predetermined diameter and a predetermined number (N1) of turns, and has a coil plane (P1) at one end of the predetermined length. The electric shield does not have any part present between the part of the casing facing the coil plane located on the one center axis and the electric shield (70), and the outer side portion of the coil antenna (110) is disposed, being spaced from said electric shield by a predetermined distance ($d_{S2}$).

18 Claims, 14 Drawing Sheets

INFORMATION PROCESSING APPARATUS WITH CONTACTLESS READER/WRITER, AND COIL ANTENNA FOR MAGNETIC COUPLING

This application is a continuing application, filed under 35 U.S.C. § 111(a), of International Application PCT/JP2003/015307, filed Nov. 28, 2003.

TECHNICAL FIELD

The present invention relates generally to an apparatus for reading from and/or writing into a contactless smart card and an RF ID tag, and, more particularly, to a structure and arrangement of a coil antenna for use in reading from and writing into a contactless smart card and an RF ID tag.

BACKGROUND ART

Recently, a contactless reader and/or writer (hereinafter sometimes referred to simply as reader/writer) for reading from and writing into a contactless smart card or contactless IC card, and an RF ID tag, has been used widely more and more. A contactless smart card is used, for example, for supervision of entry into and exit from a room, personal identification, traffic ticketing and electronic money. An RF ID tag is used, for example, in commodity management, room entry and exit supervision, and physical distribution management. Also, PAN (Personal Area Network) communications using contactless smart cards and RF ID tags have been proposed. It is expected that such a reader/writer will be incorporated into small-sized information processing apparatuses, such as personal computers, PDAs and cellular phones. It is also expected that contactless smart card and RF ID tag functions will be incorporated into mobile apparatuses, such as PDAs and cellular phones.

FIG. 19 illustrates transmitting and receiving RF signals between a contactless reader/writer (R/W) 90 and a contactless smart card or an RF ID tag 20 incorporated in an information processing apparatus 10 via respective coil antennas ANT, through magnetic coupling or transformer coupling. The reader/writer 90 transmits a carrier modulated with a command signal to the contactless smart card 20. The smart card 20 rectifies the modulated carrier signal to obtain driving power. When the intensity of modulated magnetic field from the reader/writer 90 is sufficiently large, the power supply of the contactless smart card 20 is ON, and communications are initiated in response to a command provided by the reader/writer 90. The contactless smart card 20 does not provide a carrier signal, but modulates the modulated carrier signal magnetic field generated by the reader/writer 90 to send a command response or the like to the reader/writer 90. Such modulated carrier signal transmission and reception is usually done through magnetic coupling or transformer coupling via their planar coil antennas having large areas.

For communications between the contactless smart card 20 and the reader/writer 90, the magnetic environments of the coil antennas of both of them must be good. A small-sized apparatus, such as a notebook personal computer, a PDA or a cellular phone, is provided with electrical metal shields over its case and substrates, or over the components built in it in order to prevent undesired RF signals from radiating from the built-in components. Thus, when a card or a reader/writer is incorporated into such an apparatus, the formation of magnetic field by the coil antennas is interfered and desirable communications cannot be achieved.

Saito disclosed, in Japanese Patent Application Publication JP 2001-284935-A published on Oct. 12, 2001, a small-sized antenna device for electromagnetic wireless communications which can be built in a portable wireless apparatus. A small-sized antenna is formed of a grounded conductor, and a loop antenna is formed of straight or non-straight parallel portions and non-straight first and second rising portions, which loop antenna, together with the grounded conductor, forms the antenna device.

In Japanese Patent Application Publication JP HEI 11-213116-A published on Aug. 6, 1999, Yamamoto et al. disclosed a contactless smart card which is resistant to bending, easy to produce and free of electric field disturbance. An intermediate sheet of the card includes an insulating sheet having a set of two adjacent linear holes facing each other, an antenna coil formed by a conductor pattern formed on the opposing and side surfaces to wrap around the portion of the insulating sheet located between the linear holes, and an IC chip connected to the end terminals of the antenna coil. The intermediate sheet has its opposing surfaces covered with card-shaped resin or paper layers.

In order for the coil antenna ANT of the reader/writer 90 of FIG. 19 to produce a satisfactory magnetic field, influence of the electrical shields on the coil antennas of both of the contactless smart card 20 and the reader/writer 90 need be eliminated. As one solution, an area of the electric shield of the case corresponding to the size of the coil antennas may be removed, which, however, causes insufficient prevention of an undesired RF signal generated in the apparatus from being radiated. Another solution may be to provide a large distance between the electric shield of the case and the coil antenna, which, however, forms an undesirable space between the coil antennas and the electric shield. This is disadvantageous in designing cases for apparatuses, in particular, cases for, e.g. PDAs and cellular phones, which are desired to be minimized in size. A further solution may be to mount a coil antenna outside the case. This, however, causes an undesired protrusion to be formed on the case, which is disadvantageous in designing apparatus cases. A still further solution may be to dispose a sheet having high magnetic permeability between the case and the coil antenna so that a satisfactory magnetic field can be formed in the vicinity of the electric shield. However, high magnetic permeability sheets are expensive.

The inventors have recognized that there is need for a coil antenna which is inexpensive, affects little the designing of a case of an apparatus, and can be built in the apparatus.

An object of the invention is to provide a small coil antenna which can be housed in a small internal space of an apparatus.

Another object of the invention is to provide an information processing apparatus with a coil antenna housed in a small internal space of the apparatus.

A further object of the invention is to realize an information processing apparatus with a simple, inexpensive coil antenna.

SUMMARY OF THE INVENTION

In accordance with an aspect of the present invention, an information processing apparatus includes a case having an insulating casing, an electric shield disposed in the case, and a contactless reader and/or writer disposed in the case. The contactless reader and/or writer includes a transceiver disposed within the case for transmitting and/or receiving an RF modulated carrier signal, and a coil antenna having a plurality of conductor turns coupled to the transceiver and disposed in a space between the electric shield and the casing within the case, for transmitting and/or receiving an RF modulated carrier signal by magnetic coupling. The coil antenna includes a predetermined number of turns wound into a generally tubular shape about one center axis to have a predetermined length and a predetermined diameter. The coil antenna has a coil plane at one end of the predetermined length. No part of the electric shield is present between the coil plane and a part of the casing facing the coil plane on the one center axis. The coil antenna has its outer side spaced from the electric shield by a predetermined distance.

In accordance with another embodiment of the invention, a coil antenna for magnetic coupling is disposed on an insulating substrate having a given thickness. The coil antenna includes a plurality of turns wound about first and second axes crossing generally at a right angle to form an L-shape with one axis being perpendicular to a major surface of the substrate, over a continuous predetermined length along the first and second axes. The coil antenna has a first coil plane wound about the first axis at one end of the predetermined length. The coil antenna has a second coil plane wound about the second axis at the other end of the predetermined length.

According to the invention, a small coil antenna can be housed in a small internal space of an apparatus, an information processing apparatus can have a coil antenna housed in a small internal space of the apparatus, and a simple, inexpensive coil antenna can be provided.

The invention will be described in connection with embodiments with reference to the accompanying drawings. Throughout the drawings, similar symbols and numerals indicate similar items and functions.

DESCRIPTION OF THE PREFERRED EMBODIMENTS

FIGS. 1A through 1D each show a coil antenna 100 or 106 for a contactless reader/writer in accordance with embodiments of the present invention, which is disposed within a case or housing 10 of an information processing apparatus 2, such as a notebook personal computer, a PDA (Personal Digital Assistant) or a cellular phone, having an information entry or information presentation device 12, such as a liquid crystal display device, a keyboard or a key pad. In the figures, arrowed broken lines represent a magnetic flux generated by the coil antenna.

Figure 19:
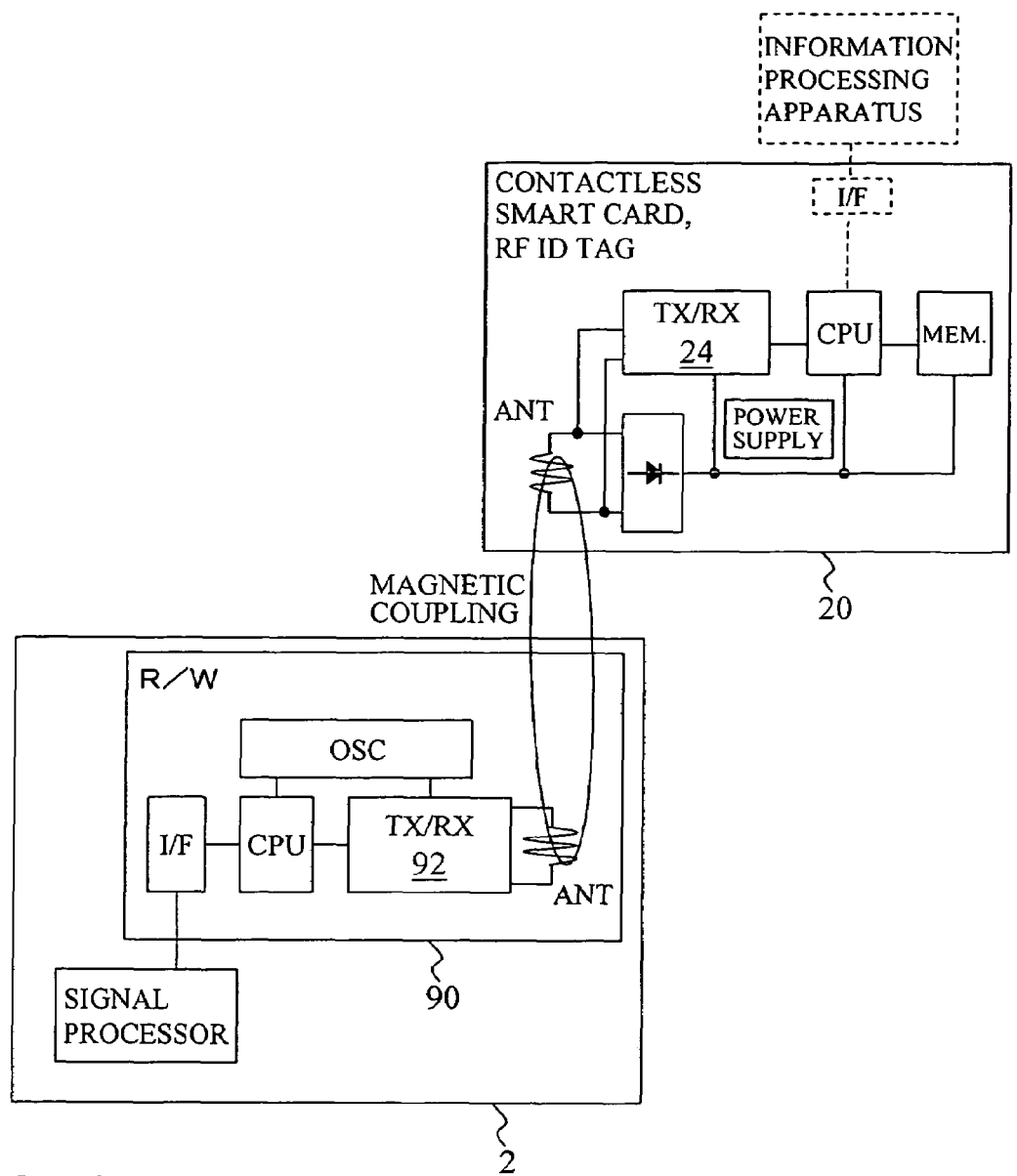
FIG. 19 illustrates transmitting and receiving RF signals between a contactless reader/writer and a contactless smart card or an RF ID tag incorporated in an information processing apparatus via respective coil antennas, through magnetic or transformer coupling.

Referring to FIG. 19, the reader/writer 90 of the information processing apparatus 2 includes a transceiver 92 coupled to a CPU, and transmits and receives, by magnetic coupling or transformer coupling through its coil antenna ANT, RF signals to and from the contactless smart card or an RF ID tag 20 having a transceiver 24 and a coil antenna ANT coupled to the transceiver 24. Alternatively, the information processing apparatus 2 may be provided with another antenna for remote electromagnetic RF signal communications, such as mobile telephone communications and wireless LAN communications. Usually, coil antennas for RF signal transmission and reception by magnetic or transformer coupling are used for communications within a range of several tens of centimeters at the maximum, and are designed according to standards different from those for antennas for use in ordinary remote transmission and reception of electromagnetic RF signals. Thus antennas for electromagnetic RF signal transmission and reception cannot be used in substitution for or in common as the magnetic or transformer coupling antennas.

The case 10 shown in FIGS. 1A through 1D has a thin, generally parallelepiped shape having a broad major surface on which the information entry or presentation device 12 is disposed, but it is not limited to that shape but may have a different shape. In order to prevent undesired RF signal radiation from a component, such as a microprocessor or a hard disc driver, within the case 10, an electric metal shield is provided in the case 10 to cover such a component. The reader/writer 90 may be disposed either outside or inside the electric shield.

The coil antenna 100 or 106 in FIGS. 1A through 1D has a generally cylindrical outer shape with one center axis, and it includes plural turns, e.g. twenty (20) turns, so wound around the center axis to extend along a predetermined length thereof and have a predetermined diameter. The coil antennas 100 and 106 are disposed outward of the electric shield and inside an electrically nonconductive outer casing. The contactless smart card 20 is preferably disposed near the coil plane at an end of the coil antenna 100 or 106 in order to transmit and receive a modulated carrier to and from the reader/writer 90.

Figure 1A:
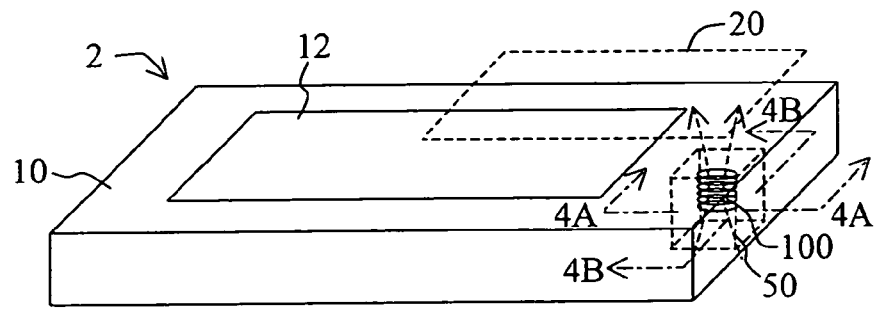
FIGS. 1A through 1D each show a coil antenna for a contactless reader and/or writer in accordance with an embodiment of the present invention, which is disposed within a case of an information processing apparatus having an information entry or information presentation area.

In FIG. 1A, the coil antenna 100 has a vertically extending center axis and is disposed in a recess at a location 50 along one side or a peripheral edge of a rectangular upper major surface of the case 10, with the upper and lower end coil planes of the coil antenna 100 located to face the upper and lower surface sides of the non-conductive outer casing of the case 10, respectively.

Figure 1B:
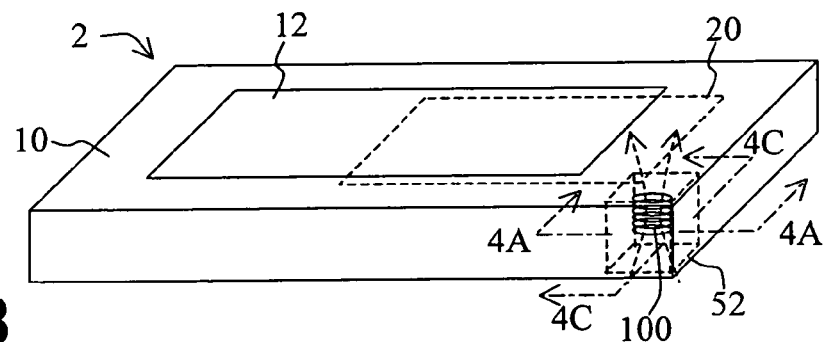

In FIG. 1B, the coil antenna 100 has a vertically extending center axis and is disposed in a recess in a corner 52 of the rectangular upper major surface of the case 10, with the upper and lower end coil planes of the coil antenna 100 located to face the upper and lower surface sides of the non-conductive outer casing of the case 10, respectively.

Figure 1C:
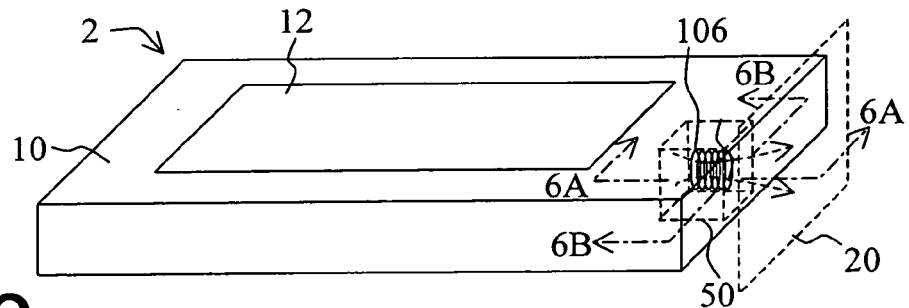

In FIG. 1C, the coil antenna 106 has a horizontally extending center axis and is disposed in a recess at the location 50 along one side or peripheral edge of the rectangular upper major surface of the case 10, with the left and right end coil planes of the coil antenna 106 located to face an outer surface side of the electric shield in the case 10 and a lateral side of the non-conductive outer casing of the case 10, respectively.

Figure 1D:
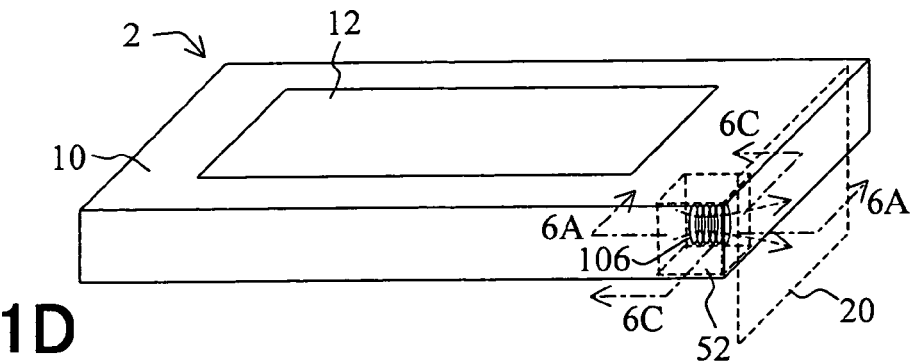

In FIG. 1D, the coil antenna 106 has a horizontally extending center axis and is disposed in the recess in the corner 52 of the rectangular upper major surface of the case 10, with the left and right end coil planes of the coil antenna 106 located to face the outer surface side of the electric shield in the case 10 and the lateral side of the non-conductive outer casing of the case 10, respectively.

FIGS. 2A through 2C and 3 show other coil antennas 110, 114 and 120 for the contactless reader and/or writer 90 disposed within the casing 10 of the information processing apparatus 2 having the information entry or information presentation device 12, in accordance with other embodiments of the invention. Each of the coil antennas 110, 114 and 120 has a generally cylindrical outer shape having axes crossing each other generally at a right angle, and includes a plurality of turns, e.g. twenty (20) turns, wound continuously around the L-shaped, generally perpendicular two center axes along a predetermined length thereof. The arrangement of the remainder of the information processing apparatus 2 is the same as the apparatus shown in FIGS. 1A through 1D.

Figure 2A:
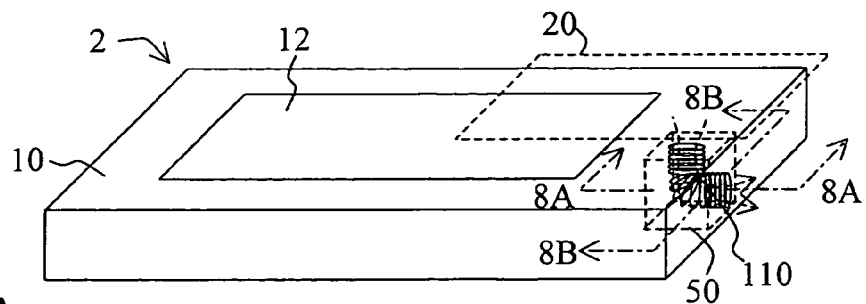
FIGS. 2A through 2C show other coil antennas for the contactless reader and/or writer disposed within the casing of the information processing apparatus having the information entry or information presentation device, in accordance with other embodiments of the invention.

In FIG. 2A, the coil antenna 110 has two, vertically and horizontally extending center axes and is disposed in the recess at the location 50 along one side or peripheral edge of the rectangular upper major surface of the case 10, with the upper and right end coil planes of the coil antenna 110 located to face the upper and lateral sides of the non-conductive casing of the case 10, respectively.

Figure 2B:
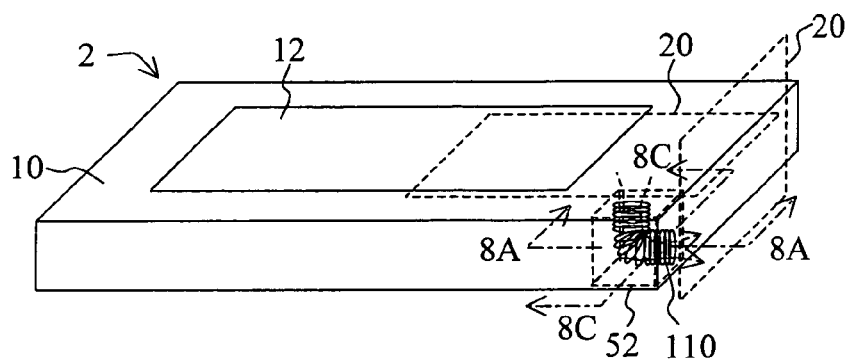

In FIG. 2B, the coil antenna 110 has two, vertically and horizontally extending center axes and is disposed in the recess in the corner 52 of the rectangular upper major surface of the case 10, with the upper and right end coil planes of the coil antenna 110 located to face the upper and lateral sides of the non-conductive casing of the case 10, respectively.

It is preferable that the two center axes cross at a right angle, but they need not cross exactly at a right angle.

Figure 2C:
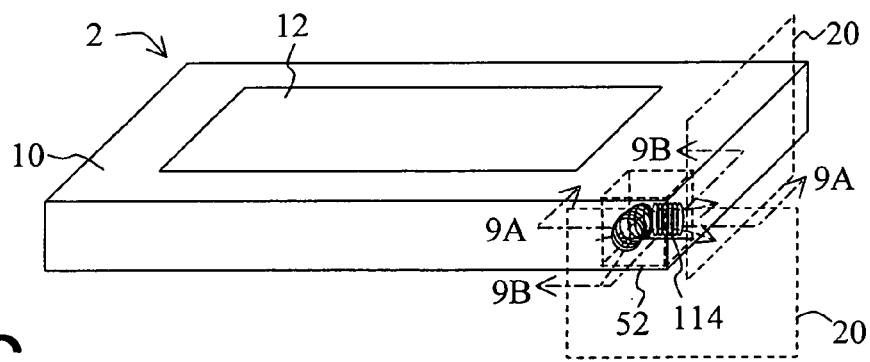

In FIG. 2C, the coil antenna 114 has two, horizontal center axes extending in different directions and is disposed in the recess at the location 50 along one side or peripheral edge of the rectangular upper major surface of the case 10, with the front and right end coil planes of the coil antenna 114 located to face the front and lateral sides of the non-conductive casing of the case 10, respectively.

Figure 3:
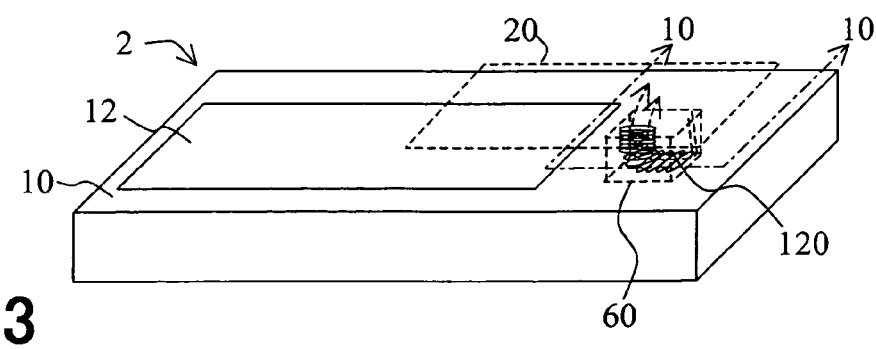
FIG. 3 show a further coil antennas for the contactless reader and/or writer disposed within the casing of the information processing apparatus having the information entry or information presentation device, in accordance with further embodiments of the invention.

In FIG. 3, the coil antenna 120 has two, vertically and horizontally extending center axes and is disposed in a recess at a location 60 of the rectangular upper major surface of the case 10, with the upper and right end coil planes about the two center axes of the coil antenna 120 located to face the upper side of the non-conductive outer casing of the case 10 and the right lateral side of such a recess of the electric shield, respectively.

Figure 4A:
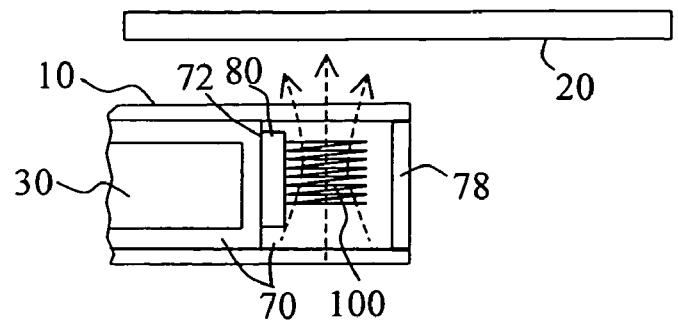
FIG. 4A is a vertical cross-sectional view along a line 4A-4A through the case shown in FIGS. 1A and 1B.
Figure 4B:
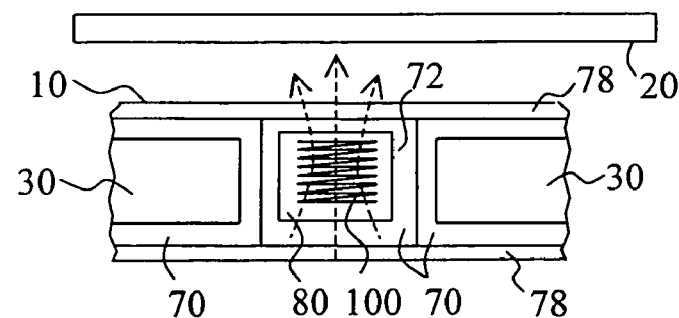
FIG. 4B is a vertical cross-sectional view along a line 4B-4B through the case shown in FIG. 1A.
Figure 4C:
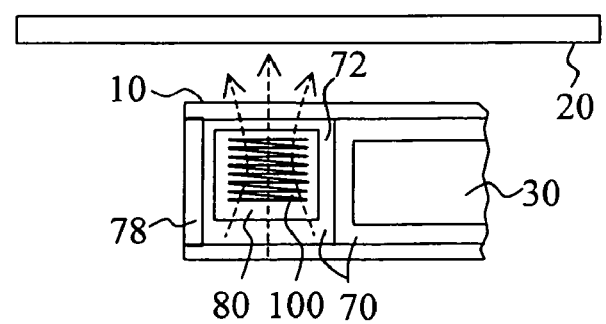
FIG. 4C is a vertical cross-sectional view along a line 4C-4C through the case shown in FIG. 1B.

FIG. 4A is a vertical cross-sectional view along a line 4A-4A through the case 10 shown in FIGS. 1A and 1B. FIG. 4B is a vertical cross-sectional view along a line 4B-4B through the case 10 shown in FIG. 1A. FIG. 4C is a vertical cross-sectional view along a line 4C-4C through the case 10 shown in FIG. 1B. FIGS. 4A and 4B show in detail how the coil antenna 100 of FIG. 1A is disposed. FIGS. 4A and 4C show in detail how the coil antenna 100 of FIG. 1B is disposed.

Figure 5A:
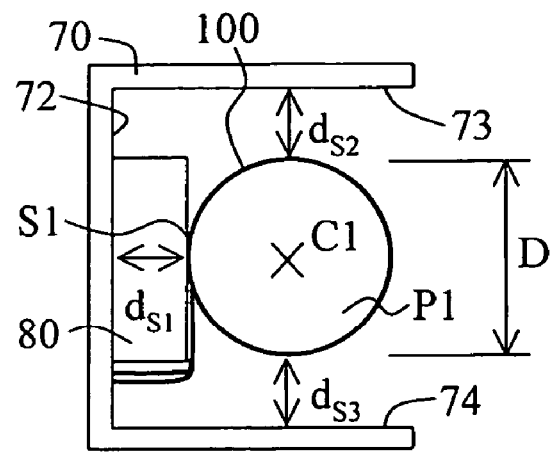
FIGS. 5A and 5B are enlarged top plan and right-side views of the coil antenna shown in FIG. 1A or 1B, respectively, and show distances of the coil antenna from outer surfaces of the electric shield in FIGS. 4A through 4C.
Figure 5B:
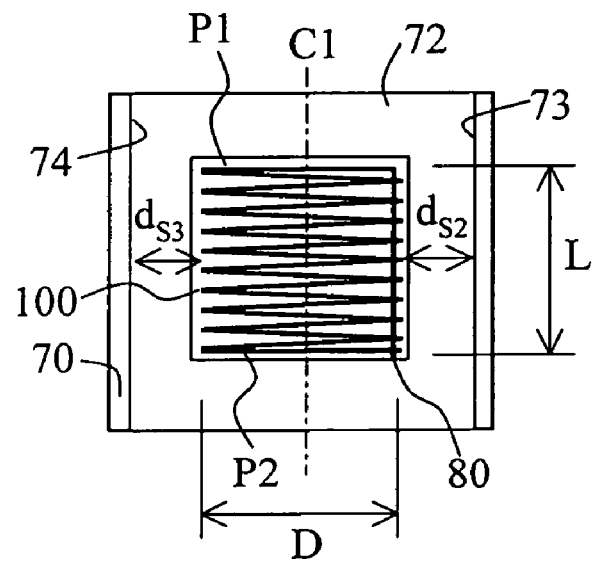

FIGS. 5A and 5B are enlarged top plan and right-side views of the coil antenna 100 shown in FIG. 1A or 1B, respectively, and show distances $d_{S1}$, $d_{S2}$ and $d_{S3}$ of the coil antenna 100 from outer surfaces 72, 73 and 74 of the electric shield 70 in FIGS. 4A through 4C. It should be noted that the case 10 of FIG. 1B does not include the outer surface 74.

The antenna 100 is disposed in the recess at the location 50 or 52, being spaced from the outer surface 72 facing an insulating substrate 80, of the electric shield 70 and one or two outer surfaces 73 and 74 generally perpendicular to the surface 72, by the distances $d_{S1}$, $d_{S2}$ and $d_{S3}$, respectively. The coil antenna 100 has a center axis C1 and secured on the insulating substrate 80, formed of a material which does not exhibit high magnetic permeability, along a portion of a side or a side line portion S1 of the cylindrical coil along a length L, and the insulating substrate 80, in turn, is secured to the outer surface 72 of the electric shield 70. The coil antenna 100 has its coil plane P1 at one end of the cylindrical coil disposed inward of a non-conductive casing 78. The casing 78 is formed of, for example, plastic. In other words, no portion of the electric shield 70 is interposed between the portion of the casing 78 facing the coil plane P1 on the center axis C1 and the coil plane P1. Similarly, a coil plane P2 at the other end of the cylindrical coil is disposed inward of the non-conductive casing 78 of the case 10.

When the contactless smart card 20 is disposed on a portion of the casing 78 near the one end coil plane P1, the reader/writer 90 reads from and/or writes into the contactless smart card 20.

About 1 mm or larger is sufficient for each of the distances $d_{S1}$, $d_{S2}$ and $d_{S3}$, and, typically, they are each within a range of from 1 mm to 6 mm for the small inner space or recess in the case 10 of the information processing apparatus 2, preferably from 1.5 mm to 3.5 mm, and more preferably from 2.0 mm to 3.0 mm. The length L of the coil antenna 100 along the center axis C1 is within a range of from 4.0 mm to 7.0 mm, preferably from 4.5 mm to 6.5 mm. The diameter or width D of the cross-section of the coil perpendicular to the center axis C1 is within a range of from 10 mm to 18 mm, preferably from 13 mm to 17 mm. The area A of the cross-section of the coil perpendicular to the center axis C1 is within a range of 70 $mm^2$ to 260 $mm^2$, preferably from 120 $mm^2$ to 230 $mm^2$. The distance between the coil antenna 100 and the non-conductive casing 78 can be 1 mm or less. The number of turns, N, of the coil antenna 100 is typically 6 or larger, preferably within a range of 16 to 25, and more preferably from 18 to 23. With the described arrangement, the coil antenna 100 can be mounted in a small recess within the case 10, which does not require an undesirable large space for the coil antenna 100 in the case 10 so that the degree of freedom in designing the case 10 can increase.

Figure 6A:
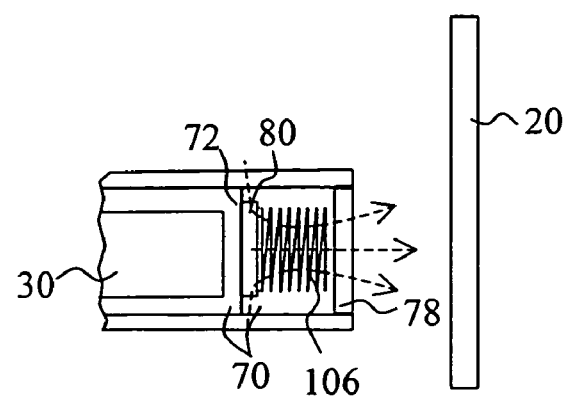
FIG. 6A is a vertical cross-sectional view along a line 6A-6A through the case shown in FIG. 1C or 1D.
Figure 6B:
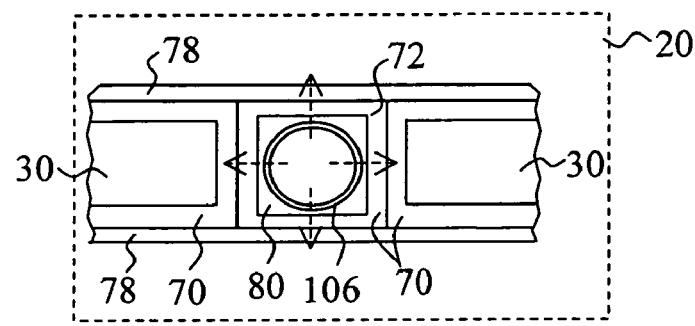
FIG. 6B is a vertical cross-sectional view along a line 6B-6B through the case shown in FIG. 1C.
Figure 6C:
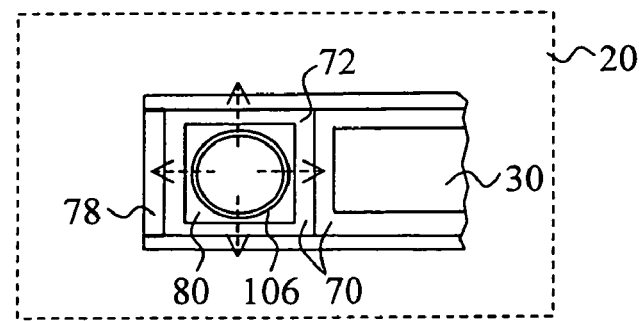
FIG. 6C is a vertical cross-sectional view along a line 6C-6C through the case shown in FIG. 1D.

FIG. 6A is a vertical cross-sectional view along a line 6A-6A through the case 10 shown in FIG. 1C or 1D. FIG. 6B is a vertical cross-sectional view along a line 6B-6B through the case 10 shown in FIG. 1C. FIG. 6C is a vertical cross-sectional view along a line 6C-6C through the case 10 shown in FIG. 1D. FIGS. 6A and 6B show in detail how the coil antenna 106 of FIG. 1C is disposed. FIGS. 6A and 6C show in detail how the coil antenna 106 of FIG. 1D is disposed.

Figure 7A:
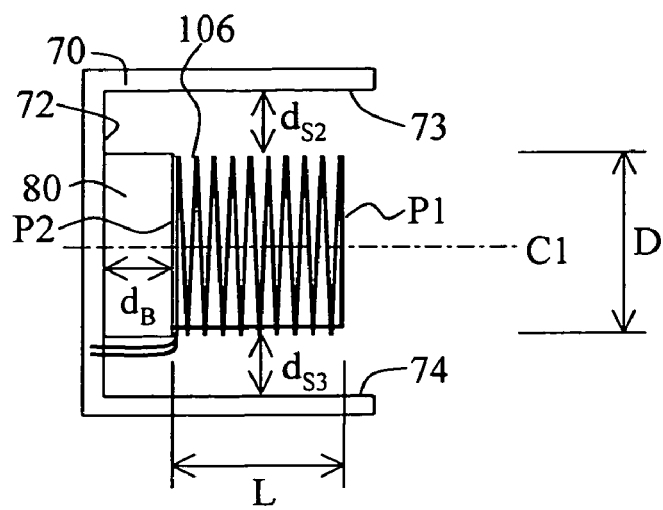
FIGS. 7A and 7B are enlarged top plan and right side views of the coil antenna shown in FIG. 1C or 1D, respectively, and show distances of the coil antenna from outer surfaces of the electric shield in FIGS. 6A through 6C.
Figure 7B:
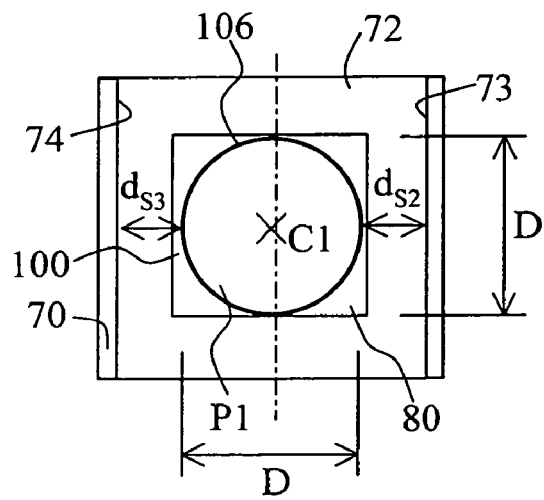

FIGS. 7A and 7B are enlarged top plan and right side views of the coil antenna 106 shown in FIG. 1C or 1D, respectively, and show distances $d_B$, $d_{S2}$ and $d_{S3}$ of the coil antenna 106 from outer surfaces 72, 73 and 74 of the electric shield 70 in FIGS. 6A through 6C. It should be noted that the case 10 of FIG. 1D does not include the outer surface 74.

The coil antenna 106 is disposed in the recess at the locations 50 and 52, being spaced from the outer surface 72 of the electric shield 70 facing the insulating substrate 80, and the outer surfaces 73 and 74 extending generally perpendicularly to the outer surface 72, by the distances $d_B$, $d_{S2}$ and $d_{S3}$, respectively. The coil antenna 106 has the center axis C1 and has its coil plane P1 at one end of the cylindrical coil disposed inward of the non-conductive casing 78 of the case 10. The coil antenna 106 has its coil plane P2 at the other end of the cylindrical coil secured on the insulating substrate 80 formed of a material which does not exhibit high magnetic permeability, and the insulating substrate 80 is secured to the outer surface 72 of the electric shield 70. In other words, the outer surface 72 of the electric shield 70 is spaced from the other coil plane P2 on the center axis C1 by the predetermined distance $d_B$.

About 1.5 mm or larger is sufficient for the distances $d_B$, and, typically, it is in a range of from 1.5 mm to 6.0 mm, preferably from 1.5 mm to 3.5 mm, and more preferably from 2.0 mm to 3.0 mm. The other dimensions and features of the coil antenna 106 are same as those of the coil antenna 100.

The length L of each of the antennas 100 and 106, along the center axis C1, is generally a quarter or one-third or larger of the diameter or width D of the respective coils, so that the area A of the coil plane can be small relative to a conventional planar antenna whose length along the center axis thereof is substantially 0 (zero). Each of the coil antennas 100 and 106 has a total length of the coil conductor somewhat longer than that of a conventional planar coil antenna, and has a larger number of turns, N, than that of the conventional planar coil antenna, whereby a magnetic field or flux is comparable to the magnetic field or flux provided by the conventional planar coil antenna can be produced. When the coil antenna 100 or 106 is used, it is not always necessary to interpose a material having high magnetic permeability between the electric shield 70 of the case 10 and the coil, which leads to substantial reduction of the manufacturing cost. For example, even when a material of high magnetic permeability, e.g. a ferrite sheet, is interposed, the amount of the necessary high magnetic permeability material can be small because the areas of the coil planes at both of the opposite ends of each of the coil antennas 100 and 106 are small.

Figure 8A:
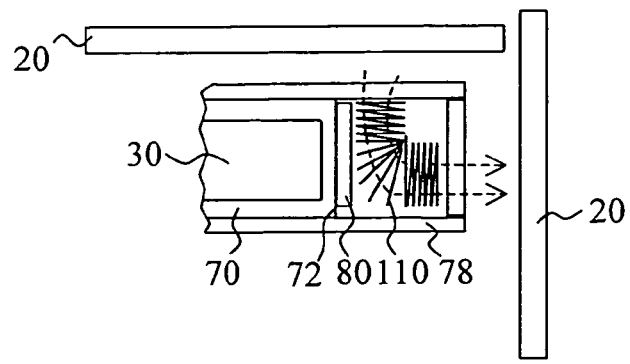
FIG. 8A is a vertical cross-sectional view along a line 8A-8A through the case shown in FIGS. 2A and 2B.
Figure 8B:
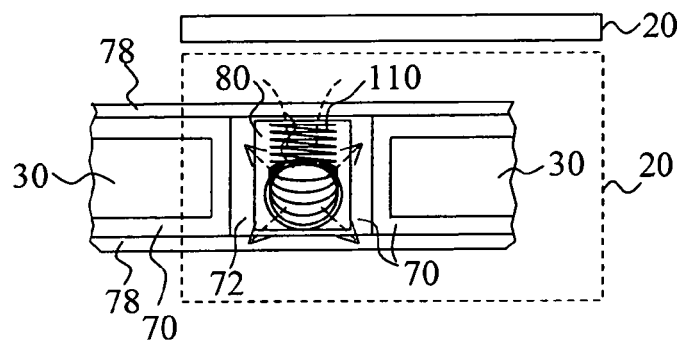
FIG. 8B is a vertical cross-sectional view along a line 8B-8B through the case shown in FIG. 2A.
Figure 8C:
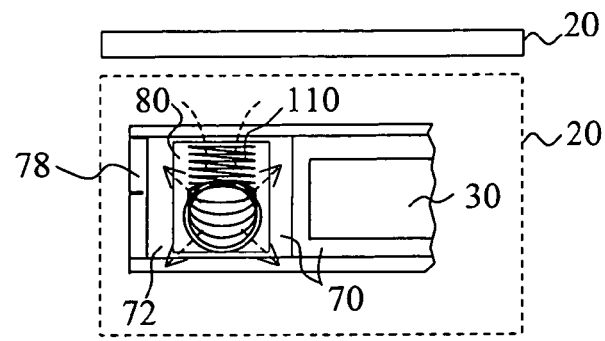
FIG. 8C is a vertical cross-sectional view along a line 8C-8C through the case shown in FIG. 2B.

FIG. 8A is a vertical cross-sectional view along a line 8A-8A through the case 10 shown in FIGS. 2A and 2B. FIG. 8B is a vertical cross-sectional view along a line 8B-8B through the case 10 shown in FIG. 2A. FIG. 8C is a vertical cross-sectional view along a line 8C-8C through the case 10 shown in FIG. 2B. FIGS. 8A and 8B show in detail how the coil antenna 110 of FIG. 2A is disposed. FIGS. 8A and 8C show in detail how the coil antenna 110 of FIG. 2B is disposed.

Figure 9A:
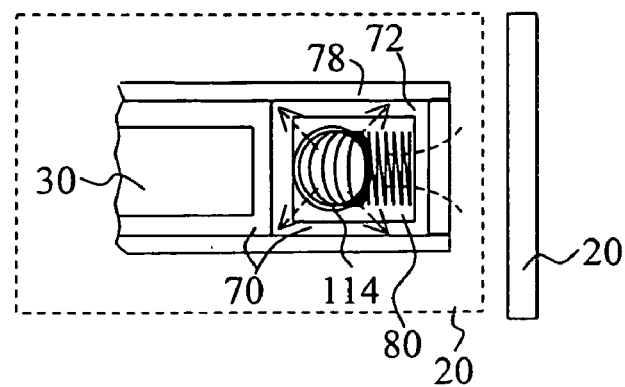
FIG. 9A is a vertical cross-sectional view along a line 9A-9A through the case shown in FIG. 2C.
Figure 9B:
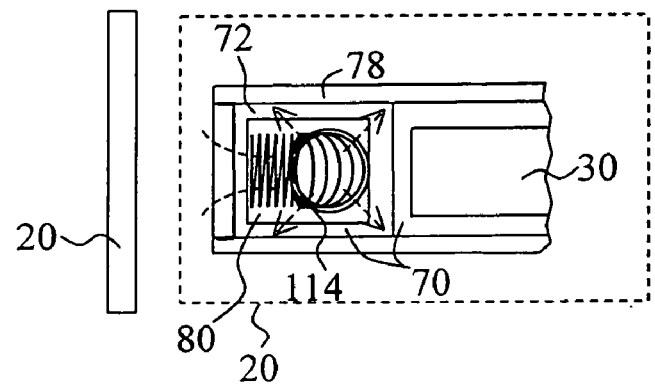
FIG. 9B is a vertical cross-sectional view along a line 9B-9B through the case shown in FIG. 2C.

FIG. 9A is a vertical cross-sectional view along a line 9A-9A through the case 10 shown in FIG. 2C. FIG. 9B is a vertical cross-sectional view along a line 9B-9B through the case 10 shown in FIG. 2C. FIGS. 9A and 9B show in detail how the coil antenna 114 of FIG. 2C is disposed.

Figure 10:
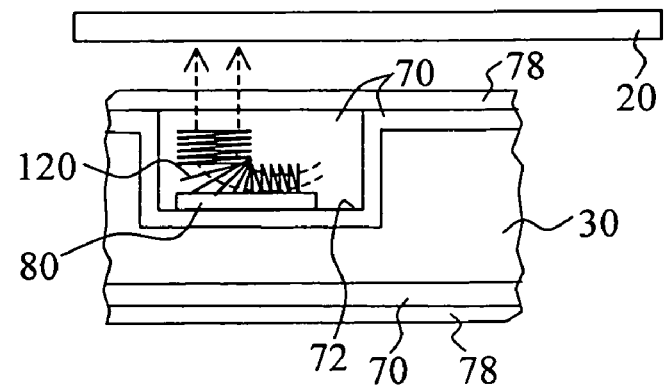
FIG. 10 is a vertical cross-sectional view along a line 10-10 through the case shown in FIG. 3.

FIG. 10 is a vertical cross-sectional view along a line 10-10 through the case 10 shown in FIG. 3. FIG. 10 shows in detail how the coil antenna 120 is disposed.

Figure 11:
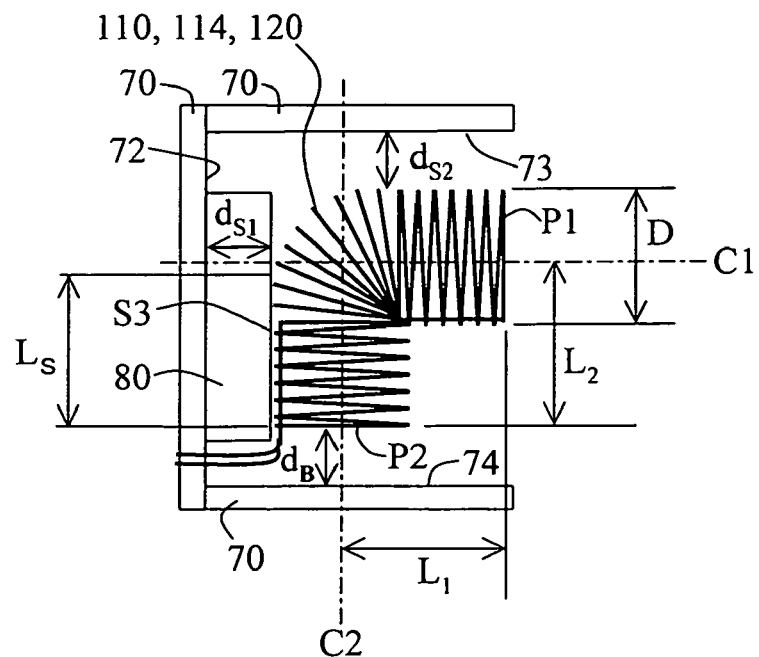
FIG. 11 is an enlarged view of FIGS. 2A through 2C and 3, and shows distances of the coil antennas shown in FIGS. 2A through 2C and 3 from the outer surfaces of the electric shield.

FIG. 11 is an enlarged view of FIGS. 2A through 2C and 3, and shows distances $d_{S1}$, $d_{S2}$ and $d_B$ of the coil antennas 110, 114 and 120 shown in FIGS. 2A through 2C and 3 from the outer surfaces 72, 73 and 74 of the electric shield 70. It should be noted, however, that the position of the coil antenna in FIG. 11 corresponds to the upside-down version of the antenna 110 shown in FIGS. 2A and 2B, to the top plan view of the coil antenna 114 of FIG. 2C, and to the version of the coil antenna 120 of FIG. 3 turned clockwise by 90°, that the case 10 of FIGS. 2A and 2B does not have the outer surfaces 73 and 74, and that the case 10 of FIG. 2C does not have the outer surface 74.

Each of the coil antennas 110, 114 and 120 has center axes C1 and C2. A portion S3 of the side surface or line of the cylindrical coil, which is generally parallel to one of the center axes, C2, of each coil antenna is secured along a predetermined length $L_S$ to the insulating substrate 80 made of a material which does not exhibit high magnetic permeability, and the insulating substrate 80 is secured to the outer surface 72 of the electric shield 70. Each of the coil antennas 110, 114 and 120 is disposed in such a manner that at least the coil plane P1 at one end thereof on the center axis C1 faces the inner surface of the non-conductive casing 78 of the case 10. In other words, the electric shield 70 does not have any portion interposed between the coil plane P1 and the part of the casing 78 facing the coil plane P1 on the center axis C1. Similarly, each of the coil antennas 110 and 114 is disposed in such a manner that the coil plane P2 at the other end of the cylindrical coil faces to the inner surface of the non-conductive casing of the case 10. The coil antenna 120 is disposed in such a manner that the coil plane P2 at the other end of the cylindrical coil faces the outer surface 74 of the electric shield 70.

Each of the coil antennas 110, 114 and 120 is disposed in the recess at the location 50, 52 or 60, being spaced from the outer surface 72 of the electric shield 70 facing the insulating substrate 80 and from either or both of the outer surfaces 73 and 74 generally perpendicular to the outer surface 72, by the distances $d_{S1}$, $d_{S2}$ and $d_B$. About 1.5 mm or larger is sufficient for the distance $d_B$, and it is typically within a range of from 1.5 mm to 6.0 mm, preferably within a range of from 1.5 mm to 3.5 mm, and more preferably within a range of from 2.0 mm to 3.0 mm. About 1 mm or larger is sufficient for each of the distances $d_{S1}$ and $d_{S2}$. When disposed in a small inner space or recess of the case 10 of the information processing apparatus 2, each of the distances $d_{S1}$ and $d_{S2}$ is typically within a range of from 1 mm to 6 mm, preferably within a range of from 1.5 mm to 3.5 mm, and more preferably within a range of from 2.0 mm to 3.0 mm. The total length L1+L2 along the generally perpendicular center axes C1 and C2 of each of the coil antennas 110, 114 and 120 corresponds to the aforementioned length L, which is typically within a range of from 4.0 mm to 7.0 mm, and preferably within a range of from 4.5 mm to 6.5 mm. The diameter or width D of the coil in the cross-section perpendicular to each of the center axes C1 and C2 is typically within a range of from 10 mm to 18 mm, and preferably within a range of from 13 mm to 17 mm. The area A of the cross-section of the coil perpendicular to each of the center axes C1 and C2 is within a range of from 70 mm² to 260 mm², preferably within a range of from 120 mm² to 230 mm². The total number of turns, N1+N2, of each of the coil antennas 110, 114 and 120 is typically 6 or larger, preferably within a range of from 17 to 24. The other dimensions, geometries and features of the coil antennas 110, 114 and 120 are the same as those of the coil antennas 100 and 106.

Figure 12:
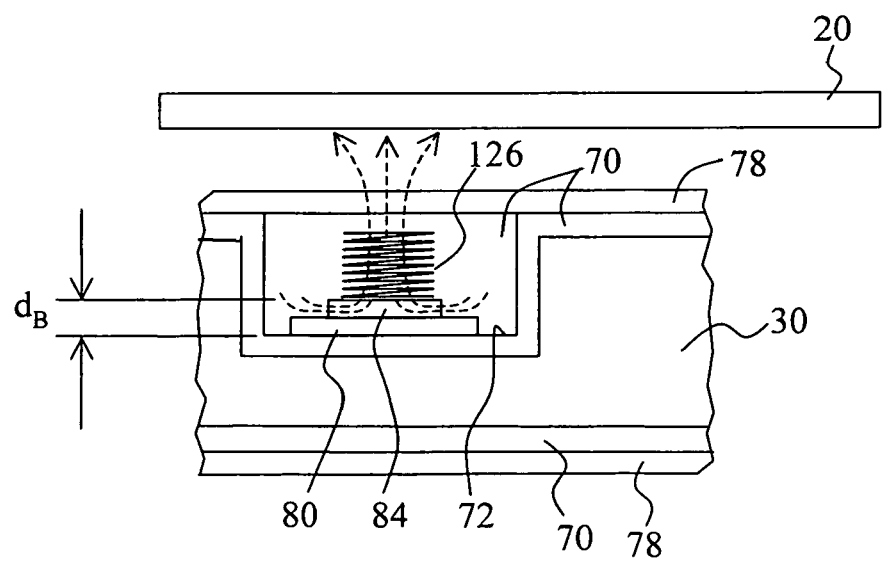
FIG. 12 shows a coil antenna in accordance with a still further embodiment of the invention, for use in the contactless reader and/or writer which is mounted at the location shown in FIG. 3 of the case of the information processing apparatus.

FIG. 12 shows a coil antenna 126 in accordance with a still further embodiment of the invention, for use in the contactless reader and/or writer 90 which is mounted at the location 60 shown in FIG. 3 of the case 10 of the information processing apparatus 2. The coil antenna 126 is disposed in a recess at the location 60 shown in FIG. 3. The coil antenna 126 has the same shape as the coil antenna 106 of FIG. 1C, but the coil plane at one end and the entire outer side surface of the coil antenna 126 are surrounded with the electric shield 70. A sheet 84 of high magnetic permeability having a small area is disposed between the coil plane of the coil antenna 126 and the insulating substrate 80. The coil antenna 126 has a larger length L and a larger number of turns, N, than a conventional planar coil antenna, while the area A of the coil plane is small, and hence the area of the high magnetic permeability material sheet 84 can be small. The use of the high magnetic permeability material sheet 84 can further reduce the distance $d_B$ between the lower end coil plane of the coil antenna 126 and the outer surface 72 of the electric shield 70.

FIGS. 13A through 13D show different structures of coil antennas 122-125 wound into a generally rectangular shape in accordance with still further embodiments of the invention.

Figure 13A:
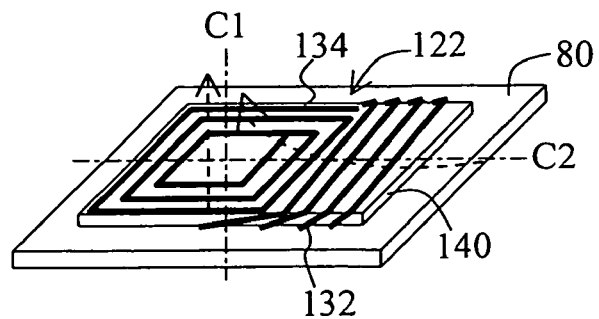
FIGS. 13A through 13D show different structures of coil antennas wound into a generally rectangular shape in accordance with still further embodiments of the invention.

In FIG. 13A, the coil antenna 122 has an L-shaped structure similar to the coil antennas 110, 114 and 120 shown in FIGS. 2A through 2C and 3. The coil antenna 122 has center axes C1 and C2 crossing generally at a right angle to form an L-shape, and a coil conductor 132 is wound slantwise in a number of turns, N2, around an insulating plate 140 through which the center axis C2 passes, with the slope of the conductor becoming gradually gentler as the winding gets close to the center axis C1, and a coil conductor 134 is wound in a number of turns, N1, on the surface of the insulating plate 140 about the center axis C1 extending perpendicular to the surface of the insulating plate 140.

Figure 13B:
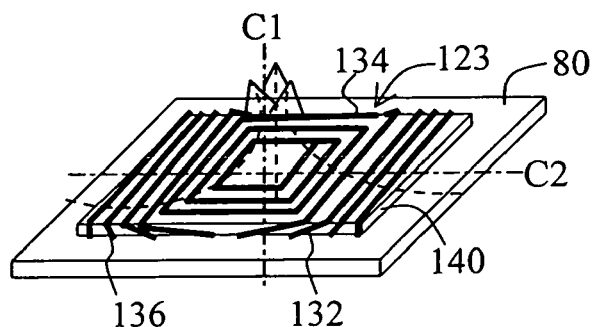

In FIG. 13B, the coil antenna 123 is branched into a T-shape. The coil antenna 123 has center axes C1 and C2 crossing generally at a right angle to form a T-shape. The coil conductor 132 is wound slantwise in a plurality of turns, N2, about the insulating plate 140 through which the center axis C2 passes, with the slope of the conductor becoming gradually gentler as the winding gets close to the center axis C1, and the coil conductor 134 is wound on the surface of the insulating plate 140 in a plurality of turns, N1, about the center axis C1 perpendicular to this surface. Further, a coil conductor 136 is wound slantwise in a plurality of turns, N3, about the insulating plate 140 through which the center axis C2 passes, with the slope of the conductor becoming gradually gentler as the winding gets close to the center axis C1. The directions in which the respective conductors are wound are such that magnetic fluxes or fields of the same magnetic polarity can be generated in the direction indicated by dashed arrows.

Figure 13C:
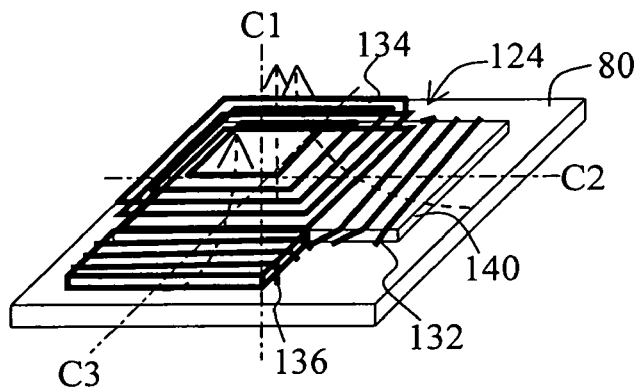

In FIG. 13C, the coil antenna 124 branches into three axial directions. The coil antenna 124 has center axes C1, C2 and C3 crossing generally at right angles. The coil conductor 132 is wound slantwise in a plurality of turns, N2, about the insulating plate 140 through which the center axis C1 passes, with the slope of the conductor becoming gradually gentler as the winding gets close to the center axis C1. The coil conductor 134 is a plurality of turns, N1, on the insulating plate 140 about the center axis C1. The coil conductor 136 is wound slantwise in a plurality, N3, of turns about the insulating plate 140 through which the center axis C3 passes, with the slope of the conductor becoming gradually gentler as the winding gets close to the center axis C1.

Figure 13D:
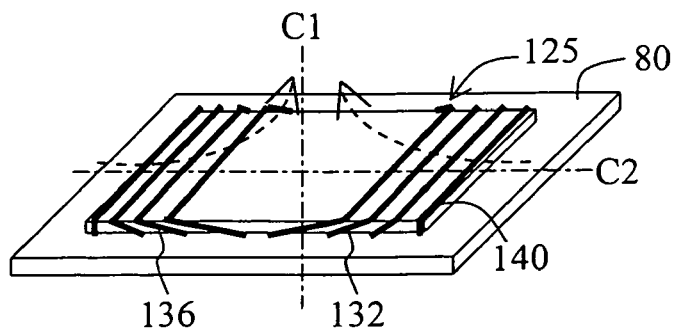

In FIG. 13D, the coil antenna 125 has center axes C1 and C2 crossing generally at a right angle. The coil conductor 132 is wound slantwise in plural turns about the insulating plate 140 through which the center axis C2 passes, with the slope of the conductor becoming gradually gentler as the winding gets close to the center axis C1. The coil conductor 136 is wound slantwise in plural turns in the opposite direction about the insulating plate 140 through which the center axis C2 passes, with the slope of the conductor becoming gradually gentler as the winding gets close to the center axis C1.

At least a part of each of the coil antennas 100, 106, 110, 114, 120, 126 and 132 as described above may be formed of multiple layered substrates with a planar coil formed on each substrate and with the planar coils connected in series.

Figure 14:
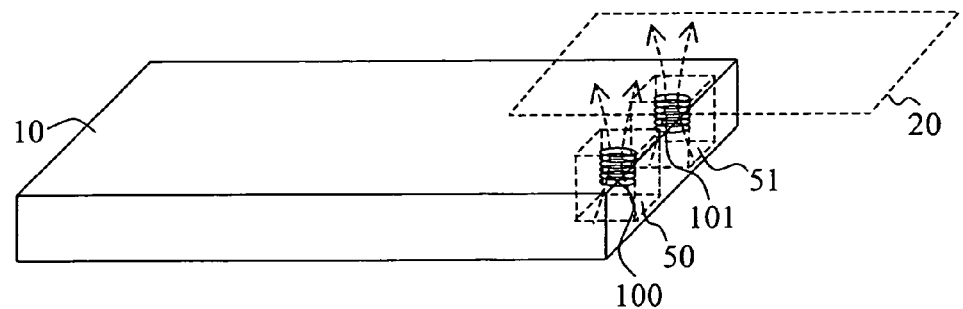
FIG. 14 shows coil antennas disposed at two close locations near one side or periphery of the rectangular upper major surface of the case.

FIG. 14 shows coil antennas 100 and 101 disposed at two close locations 50 and 51 near one side or periphery of the rectangular upper major surface of the case 10. The contactless smart card 20 is placed near to end coil planes of the two coil antennas 100 and 101, whereby the magnetic field coupled between the coil antennas 100 and 101 of the reader/writer 90 and the coil antenna of the contactless smart card 20 is further enhanced, so that the signal transmission and reception between the reader/writer 90 and the contactless smart card 20 can be further ensured.

Figure 15:
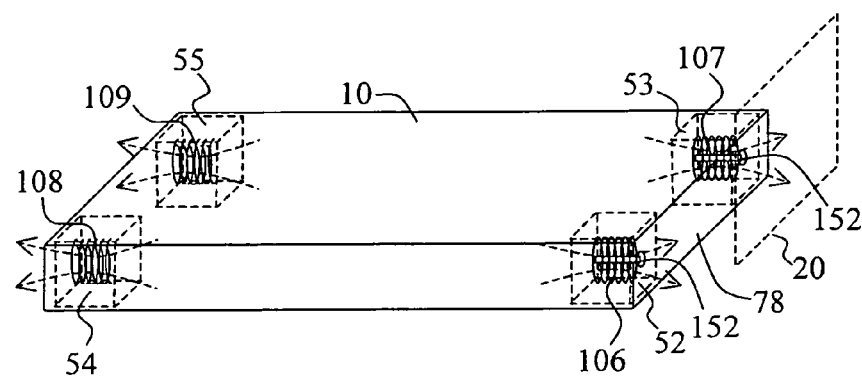
FIG. 15 shows four coil antennas, each having a horizontally extending center axis, disposed in recesses respectively in four corners of the rectangular upper major surface of the case.

FIG. 15 shows four coil antennas 106, 107, 108 and 109, each having a horizontally extending center axis, disposed in recesses respectively in four corners 52, 53, 54 and 55 of the rectangular upper major surface of the case 10. The contactless smart card 20 is placed close to one end coil plane of any of the four coil antennas 106, 107, 108 and 109, whereby the degree of freedom of placing the contactless smart card 20 increases. The coil antennas, e.g. the coil antennas 106 and 107, may be disposed so as to surround respective bolts 152 used to secure the casing 78 of the case 10, whereby the inner space for housing the coil antennas 106 and 107 can be more easily secured.

Figure 16:
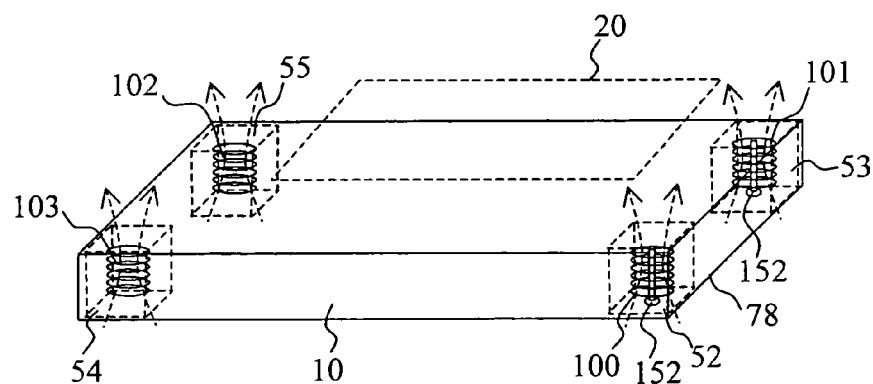
FIG. 16 shows four coil antennas, each having a vertically extending center axis, disposed in recesses respectively in the four corners of the rectangular upper major surface of the case.

FIG. 16 shows four coil antennas 100, 101, 102 and 103, each having a vertically extending center axis, disposed in recesses respectively in the four corners 52, 53, 54 and 55 of the rectangular upper major surface of the case 10. When the contactless smart card 20 is placed at the center of the upper surface of the case 10, the four corners of the contactless smart card 20 can be located near respective one end coil planes of the four coil antennas 100, 101, 102 and 103, whereby the magnetic field coupled between the coil antennas 100, 101, 102 and 103 of the reader/writer 90 and the coil antenna of the contactless smart card 20 can be enhanced, so that the signal transmission and reception between the reader/writer 90 and the contactless smart card 20 can be further ensured. The coil antennas, e.g. the coil antennas 100 and 101, may be disposed to surround the respective bolts 152 used to secure the casing 78 of the case 10, whereby the inner space for housing the coil antennas 100 and 101 can be more easily secured.

Figure 17:
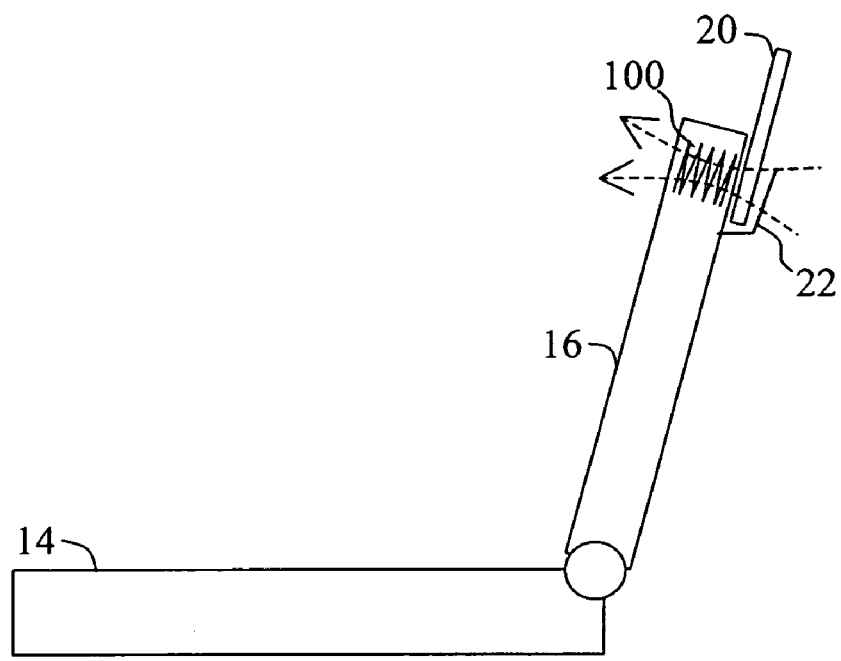
FIG. 17 shows a notebook personal computer with the coil antenna mounted in the top end portion of a display case functioning as the case.

FIG. 17 shows a notebook personal computer 14 with the coil antenna 100 mounted in the top end portion of a display case 16 functioning as the case 10. The display case 16 includes a card holder 22 on its exterior surface in the vicinity of the coil plane at one end of the coil antenna 100, whereby the position where the contactless smart card 20 is to be placed can be indicated, and the magnetic coupling between the coil antenna 100 and the coil antenna of the contactless card 20 can be ensured.

FIGS. 18A through 18D show antenna units 290, 292, 294 and 296, respectively, which are mounted along one side of a rectangular upper major surface in an information processing apparatus 270.

Figure 18A:
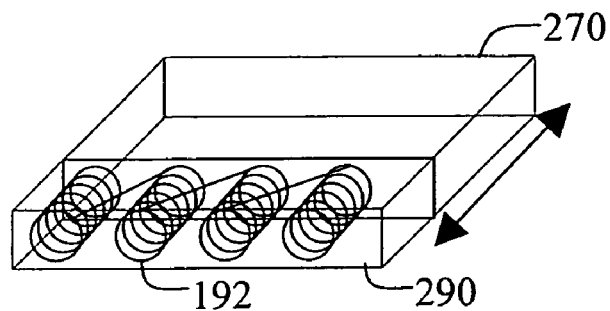
FIGS. 18A through 18D show antenna units, respectively, which are mounted along one side of a rectangular upper major surface in an information processing apparatus.

In FIG. 18A, the antenna unit 290 includes a coil antenna 192 having a plurality of cylindrical coil sections with parallel, horizontally extending center axes, disposed in parallel and connected in series.

Figure 18B:
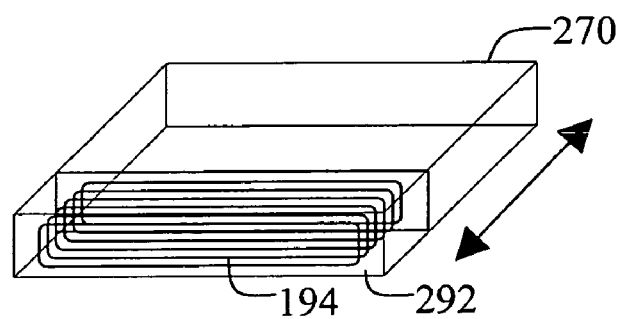

In FIG. 18B, the antenna unit 292 includes a coil antenna 194 wound around a single, horizontally extending center axis into a shape of a hollow parallelepiped.

Figure 18C:
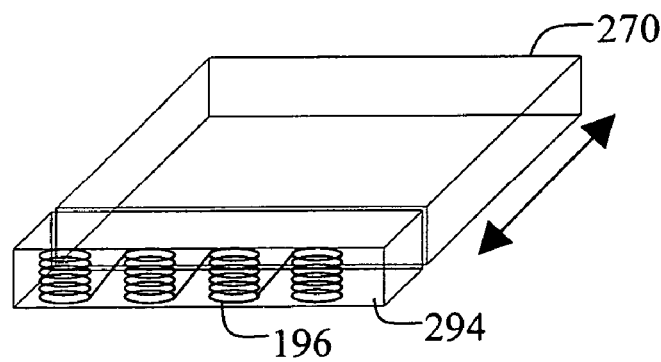

In FIG. 18C, the antenna unit 294 includes a coil antenna 196 having a plurality of cylindrical coil sections with parallel, vertically extending center axes, disposed in parallel and connected in series.

Figure 18D:
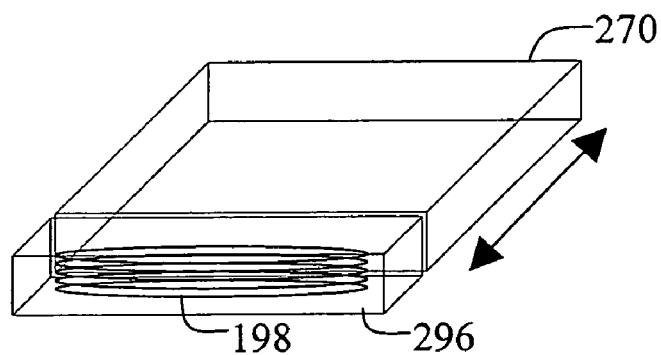

In FIG. 18D, the antenna unit 296 includes a coil antenna 198 wound around a single, vertically extending center axis into a shape of an oval cylinder.

By employing the structures shown in FIGS. 18A through 18D for the antenna units 290-296, the space to be secured for housing the antenna units 290-296 can be small. The information processing apparatus 270 may be the small-sized information processing apparatus 2 including the contactless reader/writer 90 or the contactless smart card 20.

According to the embodiments of the present invention, the antenna coil plane can be made smaller, which enables the area of the outer surface 72 of the electric shield 70 recessed from the casing 78 to be smaller, e.g. to an area on the order of 17 mm×17 mm. This leads to minimization of the area of the high magnetic permeability sheet. By virtue of disposing a coil antenna at a location along an edge or a corner of a major surface of the case 10, an adverse effect of the electric shield in the case 10 to a coil antenna of another contactless smart card 20 or reader/writer 90 with which communications are being held can be reduced.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. An information processing apparatus comprising a case including an insulating casing, an electric shield disposed in said case, and a contactless reader and/or writer disposed in said case;

said contactless reader and/or writer comprising:
a transceiver disposed within said case for transmitting and/or receiving an RF modulated carrier signal; and
a coil antenna having a plurality of conductor turns coupled to said transceiver and disposed in a space between said electric shield and said casing within said case, for transmitting and/or receiving an RF modulated carrier signal by magnetic coupling;
said coil antenna including a predetermined number of turns wound into a generally tubular shape about one center axis to have a predetermined length and a predetermined diameter, said coil antenna having a coil plane at one end of said predetermined length;
no part of said electric shield being present between said coil plane and a part of said casing facing said coil plane on said one center axis, said coil antenna having its outer side spaced from said electric shield by a predetermined distance.

2. The apparatus according to claim 1 wherein said coil antenna has another coil plane through which said one center axis passes, and no part of said electric shield is present between another part of said casing facing said other coil surface on said one center axis and said other coil plane.

3. The apparatus according to claim 2 wherein said coil antenna is secured to one of surfaces of an insulating substrate, and the other surface of said insulating substrate is secured to a surface of said electric shield.

4. The apparatus according to claim 2 wherein said coil antenna is disposed along an edge of a broad major surface of said case.

5. The apparatus according to claim 1 wherein said coil antenna has another coil plane through which said one center axis passes, and a part of said electric shield is disposed at a location spaced from said other coil plane on said one center axis by a predetermined distance.

6. The apparatus according to claim 5 wherein a high magnetic permeability member is disposed between said other coil plane and said part of said electric shield.

7. The apparatus according to claim 6 wherein said coil antenna is secured to one of surfaces of an insulating substrate, and the other surface of said insulating substrate is secured to a surface of said electric shield.

8. The apparatus according to claim 5 wherein said coil antenna is secured to one of surfaces of an insulating substrate, and the other surface of said insulating substrate is secured to a surface of said electric shield.

9. The apparatus according to claim 5 wherein said coil antenna is disposed along an edge of a broad major surface of said case.

10. The apparatus according to claim 1 wherein said coil antenna is wound about said first center axis and a second center axis crossing generally at a right angle, over a predetermined continuous length along said first and second center axes to have the predetermined diameter, and said coil antenna has a second coil plane wound about said second axis at the other end of said predetermined length.

11. The apparatus according to claim 6 wherein said coil antenna is secured to one of surfaces of an insulating substrate, and the other surface of said insulating substrate is secured to a surface of said electric shield.

12. The apparatus according to claim 10 wherein said coil antenna is disposed along an edge of a broad major surface of said case.

13. The apparatus according to claim 1 wherein said coil antenna is secured to one of surfaces of an insulating substrate, and the other surface of said insulating substrate is secured to a surface of said electric shield.

14. The apparatus according to claim 13 wherein said coil antenna is disposed along an edge of a broad major surface of said case.

15. The apparatus according to claim 1 wherein said coil antenna is disposed along an edge of a broad major surface of said case.

16. A coil antenna for magnetic coupling, disposed on an insulating substrate, said coil antenna comprising a plurality of turns wound about first and second axes crossing generally at a right angle to form an L-shape with one of said first and second axes perpendicular to a major surface of said substrate, over a continuous predetermined length along said first and second axes;

said coil antenna having a first coil plane wound about said first axis at one end of said predetermined length;

said coil antenna having a second coil plane wound about said second axis at the other end of said predetermined length; and a part of an outer side of a first coil portion wound about said first axis engages the major surface of said substrate which is generally in parallel with said first axis, and said second coil plane of a second coil portion wound about said second axis of said coil antenna is disposed to be substantially the most remote, of the coil planes of said coil antenna, from said major surface.

17. The coil antenna according to claim 16 wherein said coil antenna is further wound about a third axis crossing said first and second axes generally at right angles at a location near the substantial intersection of said first and second axes, over a predetermined continuous length along said third axis.

18. A coil antenna for magnetic coupling, disposed on an insulating substrate having a given thickness, said coil antenna comprising a plurality of turns wound about first and second axes crossing generally at a right angle to form an L-shape with one of said first and second axes perpendicular to a major surface of said substrate, over a continuous predetermined length along said first and second axes;

said coil antenna having a first coil plane wound about said first axis at one end of said predetermined length;

said coil antenna having a second coil plane wound about said second axis at the other end of said predetermined length; and said coil antenna being further wound about a third axis crossing said first and second axes generally at right angles at a location near the substantial intersection of said first and second axes, over a predetermined continuous length along said third axis.

* * * * *

UNITED STATES PATENT AND TRADEMARK OFFICE
CERTIFICATE OF CORRECTION

| | |
|---|---|
| PATENT NO. | : 7,280,076 B2 |
| APPLICATION NO. | : 11/366750 |
| DATED | : October 9, 2007 |
| INVENTOR(S) | : Teruhisa Ninomiya et al. |

Page 1 of 1

It is certified that error appears in the above-identified patent and that said Letters Patent is hereby corrected as shown below:

Column 13, Line 15, change "6" to --10--.

Signed and Sealed this

Eleventh Day of November, 2008

JON W. DUDAS
*Director of the United States Patent and Trademark Office*